C. W. GROENING.
GAS LIGHT ATTACHMENT.
APPLICATION FILED APR. 14, 1910.
992,654.
Patented May 16, 1911.
4 SHEETS—SHEET 2.
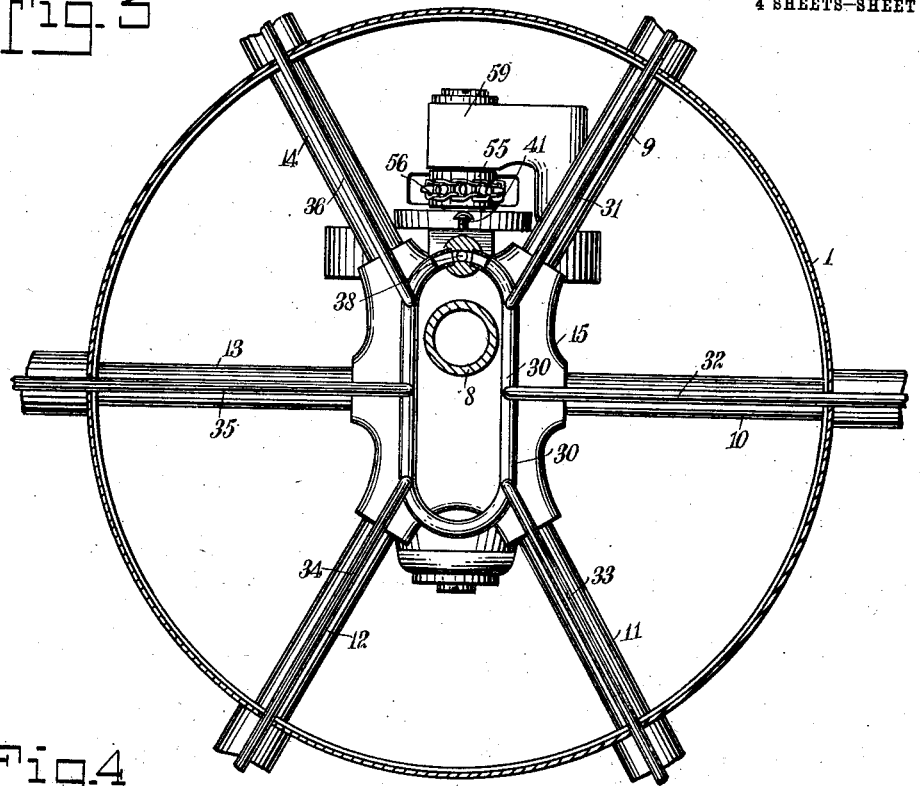
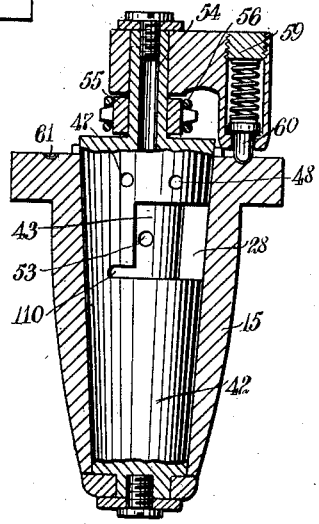
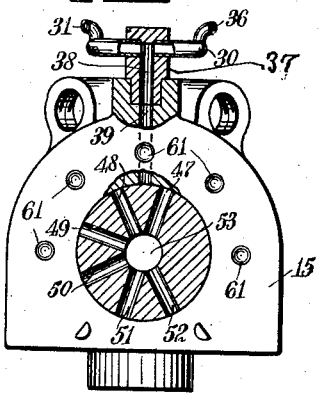
WITNESSES:
INVENTOR
Charles W. Groening
BY
ATTORNEYS C. W. GROENING.
GAS LIGHT ATTACHMENT.
APPLICATION FILED APR. 14, 1910.
992,654.
Patented May 16, 1911.
4 SHEETS—SHEET 3.
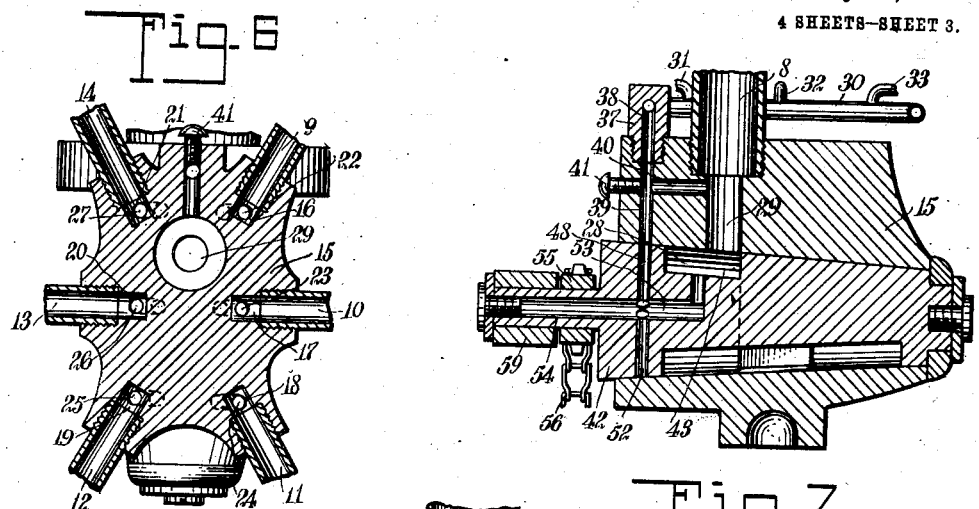
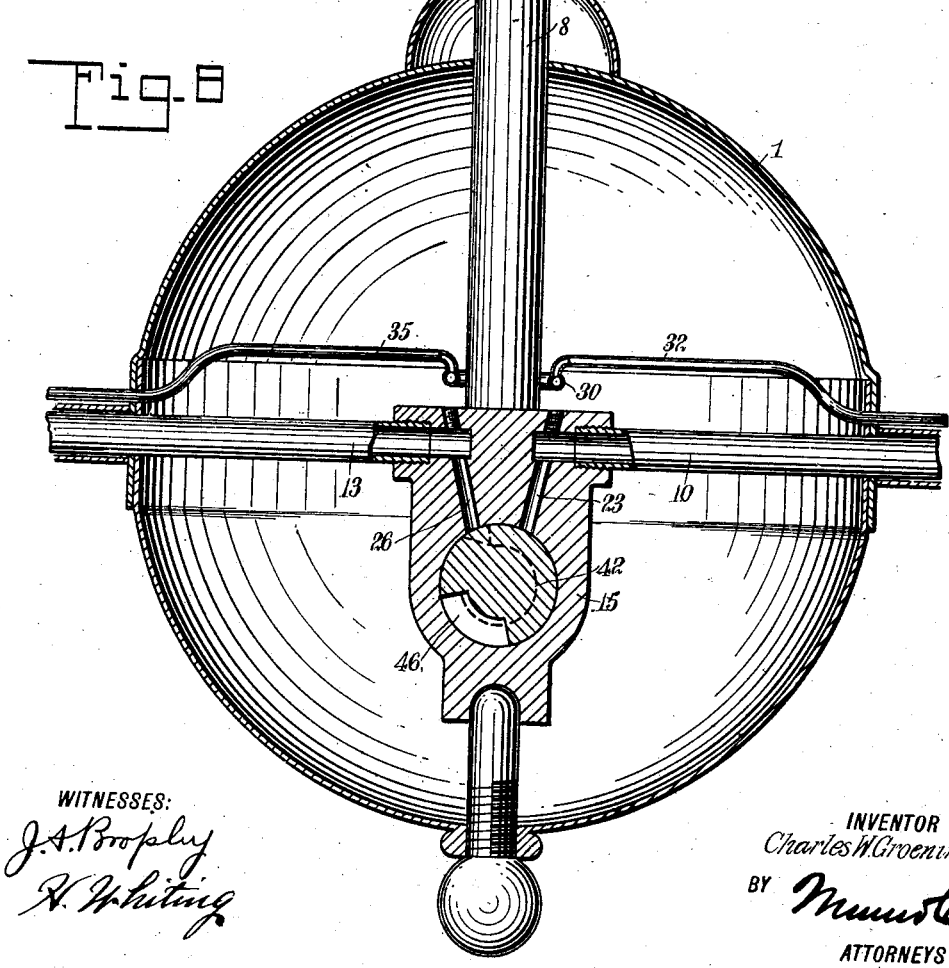
WITNESSES:
J. A. Brophy
H. Whiting
INVENTOR
Charles W. Groening
BY Munn & Co
ATTORNEYS C. W. GROENING.
GAS LIGHT ATTACHMENT.
APPLICATION FILED APR. 14, 1910.
992,654.
Patented May 16, 1911.
4 SHEETS—SHEET 4.
Fig. 9.
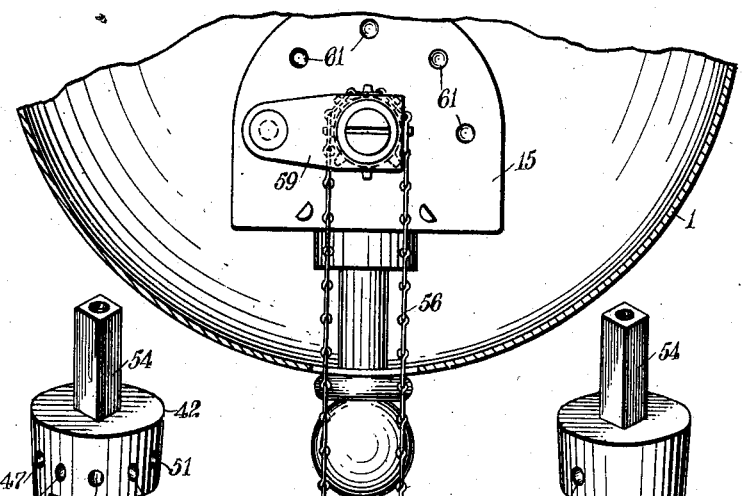
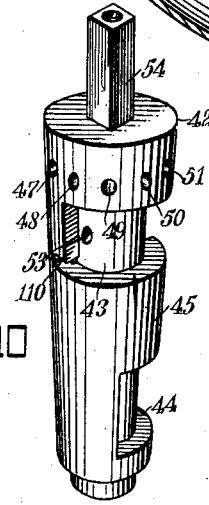
Fig. 10.
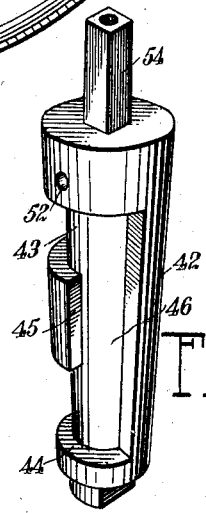
Fig. 11.
Fig. 12.
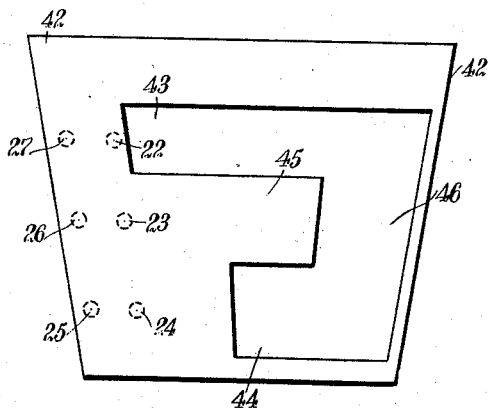
WITNESSES:
J. A. Brophy
H. Whiting
INVENTOR
Charles W. Groening
BY
ATTORNEYS

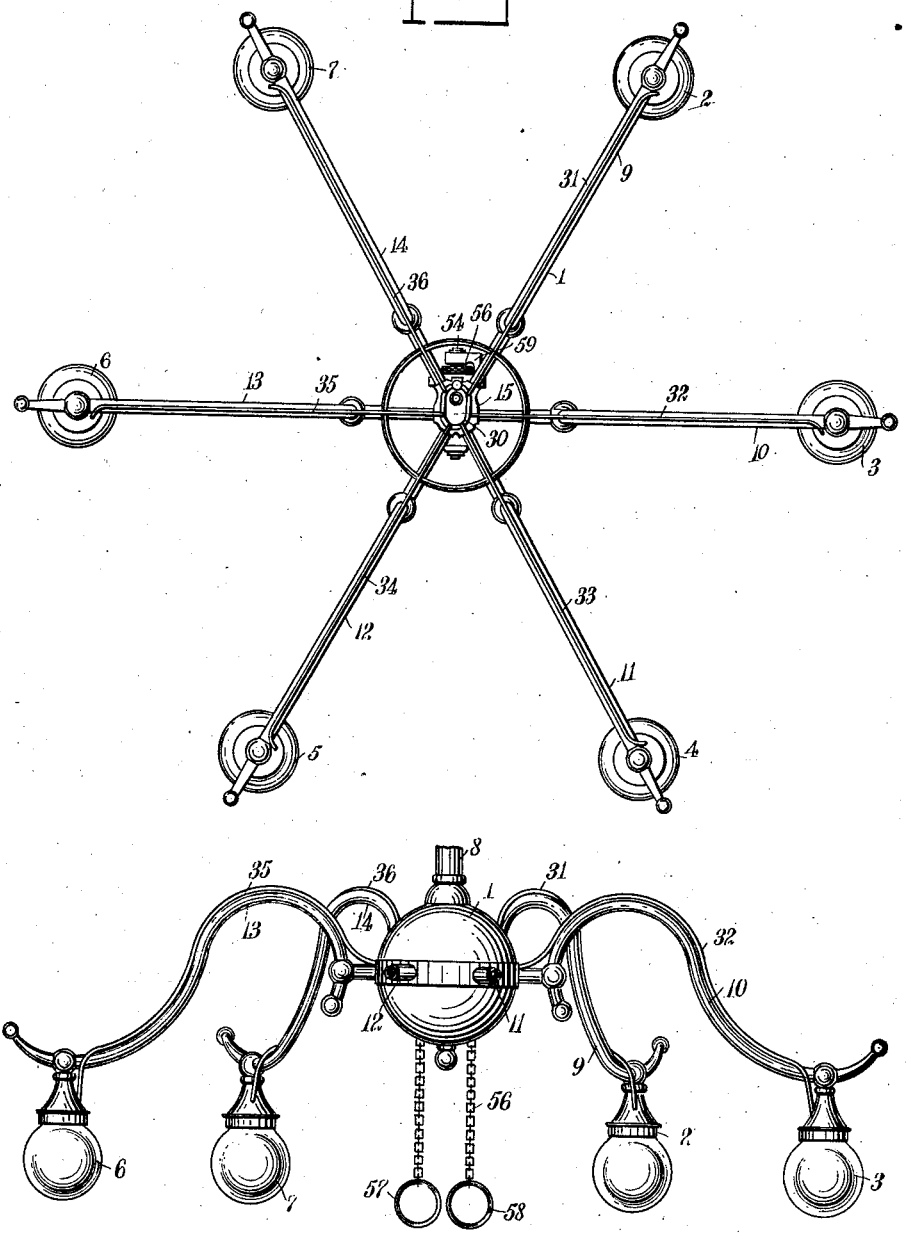

UNITED STATES PATENT OFFICE.

CHARLES W. GROENING, OF NEW YORK, N. Y.

GAS-LIGHT ATTACHMENT.

992,654.

Specification of Letters Patent.   Patented May 16, 1911.

Application filed April 14, 1910.  Serial No. 555,420.

*To all whom it may concern:*

Be it known that I, CHARLES W. GROENING, a citizen of the United States, and a resident of the city of New York, borough of Brooklyn, in the county of Kings and State of New York, have invented a new and Improved Gas-Light Attachment, of which the following is a full, clear, and exact description.

This invention relates to a new and improved attachment for gaslights, whereby a cluster of lights on a chandelier may be successively and individually controlled.

An object of this invention is to provide a device which will be comparatively simple in construction, inexpensive to manufacture, strong, durable, readily adjustable, and both quick and positive in its operation.

A further object of this invention is to provide a device adapted to control the flow of gas to any one of a plurality of burners arranged in a cluster, with means for simultaneously controlling the ignition of the gas flowing from said burners.

These and further objects, together with the construction and combination of parts, will be more fully described hereinafter and particularly set forth in the claims.

Reference is to be had to the accompanying drawings forming a part of this specification, in which similar characters of reference indicate corresponding parts in all the views, and in which—

Figure 1 is a top plan view, showing my device attached to a cluster of lights; Fig. 2 is a side view in elevation, partly broken away; Fig. 3 is an enlarged horizontal section showing the arrangement of the pilot tubes; Fig. 4 is a horizontal section through the controlling valve; Fig. 5 is a vertical section through the controlling valve; Fig. 6 is a horizontal section through the controlling valve casing, showing the supply gas pipe leading therefrom; Fig. 7 is a vertical section through the valve and the casing, taken longitudinally of the valve; Fig. 8 is a transverse section through the valve; Fig. 9 is a vertical section showing an end view of the valve casing, with the means for operating the valve; Fig. 10 is a perspective view of one side of the valve proper; Fig. 11 is a perspective view of the other side of the valve proper; and Fig. 12 is a diagrammatic illustration showing a development of the outer surface of the valve proper with its relation to the various inlets for the gas-supply pipe.

Referring more particularly to the separate parts of the device, 1 indicates a chandelier of any suitable form, preferably provided with a cluster of six lights, 2, 3, 4, 5, 6 and 7, which are connected to a main supply pipe 8 by means of suitable burner supply conduits 9, 10, 11, 12, 13 and 14, which extend to a suitable valve casing 15, to which the main supply pipe 8 is also connected.

It will be seen by reference to Fig. 6 that the burner supply conduits 9 to 14 are connected respectively to passages 16, 17, 18, 19, 20 and 21 in the valve casing 15, which in turn are in connection with outlets 22, 23, 24, 25, 26 and 27, facing on an inner enlarged chamber 28 of the valve casing 15.

It will be seen by reference to Fig. 7 that the main supply pipe 8 is connected to a passage 29 in the valve casing 15, which is also in communication with the chamber 28 and thereby provides the chamber 28 with a supply of gas from the main pipe 8.

For the purpose of maintaining a pilot light in juxtaposition to each of the lights 2 to 7, which are adapted to ignite the latter, there is provided a pilot loop 30, from which extend pilot tubes 31, 32, 33, 34, 35 and 36, terminating in juxtaposition to the burners on the lights 2 to 7 respectively. The loop 30 is supported in any well known manner in the casing 15, as by means of a plug 37, which has a passage 38 therein, communicating, by means of passages 39 and 40 in the valve casing 15, with the passage 29. It will thus be seen that there is a continuous direct flow of gas from the main supply pipe to the pilot tubes 31 to 36, so that the pilot burners will always be maintained with the necessary supply of gas to keep them lighted with a very small pin-point flame. The amount of this gas which flows to the pilot loop 30, and thus to the pilot burners, is controlled in any suitable manner, as by means of a valve screw 41, which is adapted to constrict the size of the passages 39 and 40.

The chamber 28 may be of any suitable form, but is preferably tapering to accommodate a tapering valve 42, which is adapted to control the flow of gas from the chamber 28 and the passage 29 to the supply conduits 9 to 14. For this purpose, the valve 42 is formed in a peculiar manner, which will be seen by referring more particularly to Figs. 7, 8, 10, 11 and 12. This valve 42 is provided with a long channel 43 and a short channel 44, separated from each other by a tongue 45. Beyond the projecting end of the tongue 45, another channel 46 is formed, which is at all times in communication with the channels 43 and 44. The channel 43 extends closest to that portion of the valve which is unprovided with channels along its longitudinal surface and which corresponds to the starting point or the closed position of the valve. That is to say when the unchanneled portion of the valve is in opposition to the outlets 22 to 27, the gas will be shut off from the burner supply conduits 9 to 14, and thus the main lights 2 to 7 will be out. In Fig. 12, the relative positions of the channels and blank portions of the valve 42 with respect to the outlets 22 to 27 are shown diagrammatically. As illustrated in Fig. 12, the position of the valve corresponds to its closed position; that is to say, when the gas supply is cut off from all of the lights 2 to 7. Now if the full-line diagram in Fig. 12 is moved past the dotted showing of the outlets 22 to 27, this motion will correspond to the rotary motion of the valve in the casing, and will illustrate the action of the valve in uncovering the respective outlets, and thus admitting gas to the respective burners. Following this action out, it will be seen that the movement of the valve will first bring into conjunction the channel 43 with the outlet opening 22, thereby uncovering the outlet 22, permitting the gas to flow from the chamber 28 into the burner supply conduit 9, and thus to the light 2. Further movement of the valve will uncover the outlet opening 27, bringing the supply conduit 14 into communication with the chamber 28 and thus with the main burner supply pipe 8. Still further movement of the valve will uncover the outlet 24 by bringing into conjunction therewith the channel 44, thus permitting the flow of gas to pass to the light 4. The next movement will bring the light 5 into communication with the supply of gas. Further movement of the valve 42 will bring the channel 46 successively into communication with the outlets 23 and 26, thus successively lighting up the lamps 3 and 6. It will thus be seen that the gas is supplied successively to the burner supply conduits and thus to the lamps or lights in the following order: 2, 7, 4, 5, 3, 6. By this arrangement, any number of lights can be provided from one to six, and the successive lights are brought in play alternately on opposite sides of the chandelier, so that at any time the illumination will be properly distributed, no matter how many lights are in use.

While the smaller flame at each of the pilot burners might be sufficient to ignite the gas flowing from the burner at each of the lamps 2 to 7, it is desired to provide each of the pilot burners with an abnormal supply of gas, so that the flame therefrom will project in a long stream in close proximity to each of the burners in the lamps or lights 2 to 7, intermediate the time of beginning to turn on the supply of gas to each particular light and the time when the full flow of gas is supplied thereto. For this purpose, there are provided in one end of the valve 42, passages 47, 48, 49, 50, 51 and 52, which correspond respectively to the pilot burner tubes 31, 36, 32, 35, 33 and 34, and are so located in the valve 42 that they will come in alinement with the passage 39 in the valve casing 15 just after the valve 42 has opened up respectively the outlets 22, 27, 24, 25, 28 and 26, and before the completion of the movement necessary to fully open these inlets. The passages 47 to 52 are interconnected, and also connected to a common passageway 53, which lets into the channel 43, and thus has communication at all times with the main supply pipe 8. This will permit a sudden flare of light from each of the pilot burners just after the supply of gas has been admitted to the lights juxtaposed to the same pilot burners, so that this supply of gas can be ignited and the pilot flames turned down to their normal pin-point magnitude, when the lamps are going full force. Pressure is maintained in passages 47 to 53 by a groove 110 in the channel 43.

For the purpose of manipulating the valve 42, it is provided with a spindle 54, which is connected thereto in any well known manner, as by being formed integral therewith, and is provided with a suitable sprocket wheel 55 secured thereto in any well known manner. Engaging the sprocket wheel 55, there is provided a suitable flexible connection in the form of a chain 56, which is provided at each end with rings 57 and 58, whereby the up and down movement of the rings 57 and 58 will rotate the valve 42 to any of its adjusted positions.

For the purpose of locking the valve in any adjusted position with any number of the lights in full force and the pilot lights turned down to their minimum magnitude, there is provided an arm 59, secured to the spindle 54 in any well known manner. This arm, as will be seen by reference to Fig. 4, is provided with a spring-pressed dog 60, normally urged into engagement with the face of the valve casing 15. The valve casing 15 is provided with a plurality of depressions 61, into which the dog 60 is adapted to fall and lock the valve against accidental rotation. These depressions 61 are spaced apart at predetermined intervals corresponding to the positions in which the successive inlets 22 to 27 will be uncovered by the valve 42.

The operation of the device will be readily understood when taken in connection with the above description. As has been stated above, the pilot lights connected to the tubes 31 to 36 respectively are maintained with slight pin-point flames at all times. When it is desired to obtain a slight illumination of the room or building, the ring 57 is pulled down a short distance. During the pulling-down operation, the outlet 22 will be first uncovered by the valve 42, bringing the channel 43 in opposition to said outlet. During the motion of the valve between the starting point and the first of the depressions 61, the passage 47 will have come into conjunction with the passage 39, permitting a sudden flare of burning fluid to flash out of the pilot tube 31, thereby igniting the gas coming to the burner in the light 2. Before the arm 59 and the dog 60 thereon have reached the second stop or depression 61; that is to say, before the gas has been turned on with full force to the light 2, the valve 42 will have moved sufficiently to remove the passage 47 from its position in alinement with the passage 39, so that the pilot flames will be depressed to their normal pin-point magnitude, the supply of gas for which is obtained through the passages 40 and 39. The further downward motion of the ring 57 will bring successively the outlets 27, 24, 25, 23 and 26 into communicating relation with the passage 28 by means of the channels 43, 44 and 46, thus successively lighting up the lamps 2, 7, 4, 5, 3, and 6 in the order given. When it is desired to turn out any or all of the lights, the ring 58 will be pulled down, so that the opposite condition of affairs will take place, gradually turning out successively the lights in their reverse order, until all of them have been cut off.

It will thus be seen that a very simple and efficient means of controlling a cluster of lights is provided, so that they will be lighted up successively in alternate relation; that is to say, the lights on opposite sides of the chandelier will be lighted up so that the room in which the cluster is located will be evenly illuminated, no matter how many lights are in use.

While I have shown one embodiment of my invention, I do not wish to be limited to the specific details thereof, but desire to be protected in various changes, modifications and alterations which I may make within the scope of the appended claims.

Having thus described my invention, I claim as new and desire to secure by Letters Patent:—

1. The combination with a casing having a chamber therein, of a valve in said chamber, said casing having outlets therein communicating with said chamber and adapted to be controlled by said valve, burner supply conduits connected to said casing and communicating with said outlets, and a supply pipe connected to said casing and communicating with said chamber, said valve having a cavity therein, with an integral tongue of said valve extending transversely of the axis of said valve, into said cavity to form a pair of channel arms on either side thereof, one of said arms being of greater dimensions than the other of said arms.

2. The combination with a casing having a chamber therein, of a valve in said chamber, said casing having outlets therein communicating with said chamber, lights connected to said outlets, and pilot tubes connected to said chamber, said valve having a cavity therein and with an integral tongue of said valve extending into said cavity to form a pair of channel arms on either side thereof, one of said arms being of greater dimensions than the other of said arms, said valve also having passages therein permitting the flow of gas to said pilot tubes, and one of said channels having an extension cut-out groove permitting the supply of gas to said tubes at all times.

In testimony whereof I have signed my name to this specification in the presence of two subscribing witnesses.

CHARLES W. GROENING.

Witnesses:
 HORATIO WHITING,
 PHILIP D. ROLLHAUS.